United States Patent
Nie et al.

(10) Patent No.: US 11,143,573 B2
(45) Date of Patent: Oct. 12, 2021

(54) VIBRATION TABLE

(71) Applicant: FATRI (Xiamen) Technologies, Co., Ltd., Xiamen (CN)

(72) Inventors: Yongzhong Nie, Xiamen (CN); Jianhai Qiu, Xiamen (CN); Wenjian Yang, Xiamen (CN)

(73) Assignee: FATRI UNITED TESTING & CONTROL (QUANZHOU) TECHNOLOGIES CO., LTD., Quanzhou (CN)

( * ) Notice: Subject to any disclaimer, the term of this patent is extended or adjusted under 35 U.S.C. 154(b) by 133 days.

(21) Appl. No.: 16/575,693

(22) Filed: Sep. 19, 2019

(65) Prior Publication Data

US 2020/0149990 A1    May 14, 2020

(30) Foreign Application Priority Data

Nov. 9, 2018  (CN) .......................... 201821850047.7

(51) Int. Cl.
  *G01M 7/02*    (2006.01)
(52) U.S. Cl.
  CPC ............. *G01M 7/022* (2013.01); *G01M 7/02* (2013.01)
(58) Field of Classification Search
  CPC .................................................. G01M 7/022
  See application file for complete search history.

(56) References Cited

U.S. PATENT DOCUMENTS

| | | | | |
|---|---|---|---|---|
| 4,715,229 A | * | 12/1987 | Butts ....................... | G01M 7/04 73/663 |
| 6,467,353 B1 | * | 10/2002 | Genix ..................... | G01M 7/08 73/1.82 |
| 2013/0234628 A1 | * | 9/2013 | He ......................... | G01M 7/022 318/128 |
| 2019/0067798 A1 | * | 2/2019 | Hao ........................ | H01Q 1/243 |

* cited by examiner

*Primary Examiner* — Herbert K Roberts
*Assistant Examiner* — John M Royston
(74) *Attorney, Agent, or Firm* — Amster, Rothstein & Ebenstein LLP

(57) ABSTRACT

The present application discloses a vibration table, comprising a magnetic circuit device for generating a magnetic field; a moving coil skeleton, disposed in the magnetic circuit device, moving up and down in the magnetic field and having a placement groove; an adapter, disposed in the placement groove; an excitation coil, radially winding along an outer peripheral wall of the moving coil skeleton and located in the magnetic field generated by the magnetic circuit device; wherein, the moving coil skeleton is provided with a cut-off groove. The vibration table provided in the present application uses a metal beryllium as a material for a moving coil skeleton and an accelerometer adapter. The large specific stiffness of the metal beryllium is used to increase the axial natural frequency of the moving coil skeleton, thereby increasing the effective working frequency range of the vibration table.

9 Claims, 3 Drawing Sheets

VIBRATION TABLE

CROSS REFERENCE TO RELATED APPLICATIONS

This application claims priority to Chinese Patent Application No. 2018218500477, filed on Nov. 9, 2018, the entire contents of which are incorporated herein by reference.

TECHNICAL FIELD

The present application refers to the field of vibration measurement, in particular to a vibration table.

BACKGROUND

A vibration table calibrates an accelerometer by a comparison method, and is one of the main tools used in vibration measurement. The comparison method is carried out by rigidly connecting a standard accelerometer and an accelerometer to be calibrated, fixing them coaxially on the vibration table, and then applying a sinusoidal excitation of a given frequency and acceleration to the vibration table, at this time, obtaining an accuracy of the accelerometer to be calibrated by comparing an output data of the standard accelerometer and the accelerometer to be calibrated. According to the provisions of China's national metrological verification procedures JJG 676-2000, an operating frequency range of the vibration table calibrated by the comparison method is from 20 Hz to 2 kHz. However, with development of technology and increasing needs of customers, more and more attentions have been paid to the calibration requirements of the accelerometer's frequency response characteristics above 2 kHz. Since the moving coil skeleton of the vibration table is made of metal materials, the vortex effect is generated inside the moving coil skeleton when it moves in the magnetic field, thereby hindering a normal vibration of the moving coil and affecting a stability of an acceleration response of the skeleton. Moreover, higher vibration frequency of the moving coil may cause stronger vortex effect generated in the skeleton, so as to make the obstruction effect more obvious, which may further greatly increase the difficulty of excitation control of the vibration table and affect the high-frequency vibration characteristics of the vibration table.

SUMMARY

The main purpose of the present application is to provide a vibration table to solve the problem that the vortex effect generated inside the moving coil skeleton hinders a normal vibration of the moving coil and affects the high-frequency vibration characteristics of the vibration table.

To achieve the above purpose, the present application provides a vibration table, comprising: a magnetic circuit device for generating a magnetic field; a moving coil skeleton, disposed in the magnetic circuit device, adapted for reciprocating in a magnetic field generated by the magnetic circuit device along a direction of a central axis of the moving coil skeleton, and having a placement groove with an upward opening; an adapter, disposed in the placement groove; an excitation coil, radially winding along an outer peripheral wall of the moving coil skeleton and located in the magnetic field generated by the magnetic circuit device; wherein, the moving coil skeleton is provided with a cut-off groove through the moving coil skeleton.

Preferably, the moving coil skeleton and the adapter are made of a metal beryllium.

Preferably, the cut-off groove has a width ranging from 3 to 6 mm.

Preferably, the magnetic circuit device comprises: a lower armature, provided with a lower armature groove; a permanent magnet, disposed in the lower armature groove; a middle armature, located above the permanent magnet; an upper armature, sleeved on the moving coil skeleton to cover an opening of the lower armature groove.

Preferably, the magnetic fields generated by the lower armature, the permanent magnet, the middle armature, and the upper armature form a closed loop.

Preferably, the middle armature is partially sleeved by the moving coil skeleton.

Preferably, the excitation coil comprises: a DC excitation coil, radially winding along the outer peripheral wall of the moving coil skeleton and located in a linear magnetic field generated by the magnetic circuit device; an AC excitation coil, radially winding along the outer peripheral wall of the moving coil skeleton and located in a uniform magnetic field generated by the magnetic circuit device.

Preferably, the moving coil skeleton is further provided with: a first groove, extending along a radial direction of the outer peripheral wall of the moving coil skeleton, with the DC excitation coil located therein; a second groove, extending along a radial direction of the outer peripheral wall of the moving coil skeleton and located below the first groove, with the AC excitation coil located therein.

Preferably, the upper armature is further provided with a hollow support pin; and the vibration table further comprises a lateral fixing device, sleeved on the moving coil skeleton and covering an opening of the support bin.

Preferably, the above vibration table further comprises a supporting member, located below the lower armature.

The technical solutions of the present application have the following advantages.

1. The vibration table provided in examples of the present application uses a metal beryllium as a material for a moving coil skeleton and an accelerometer adapter. The large specific stiffness of the metal beryllium is used to increase the axial natural frequency of the moving coil skeleton, thereby increasing the effective working frequency range of the vibration table, i.e., improving its high-frequency performance.

2. The vibration table provided in examples of the present application substantially reduces the vortex effect generated inside the moving coil skeleton by providing a cut-off groove on the moving coil skeleton, thereby solving the problem of affecting an acceleration response of the moving coil skeleton, and making the acceleration response of the vibration table more stable, which reduces the difficulty of vibration control of the vibration table and improves its high-frequency performance, and increases the effective working frequency response range of the vibration table.

BRIEF DESCRIPTION OF THE DRAWING

One or more embodiments are illustrated by way of example, and not by limitation, in the figures of the accompanying drawings, wherein elements having the same reference numeral designations represent like elements throughout. The drawings are not to scale, unless otherwise disclosed.

In order to more clearly illustrate the technical solutions of the embodiments of the present application or the prior art, the drawings used in the embodiments of the present application or the prior art will be briefly described below. Obviously, the drawings in the following description are only some embodiments of the present application, and those skilled in the art can obtain other drawings based on these drawings without any creative efforts. In drawings.

Figure 1:
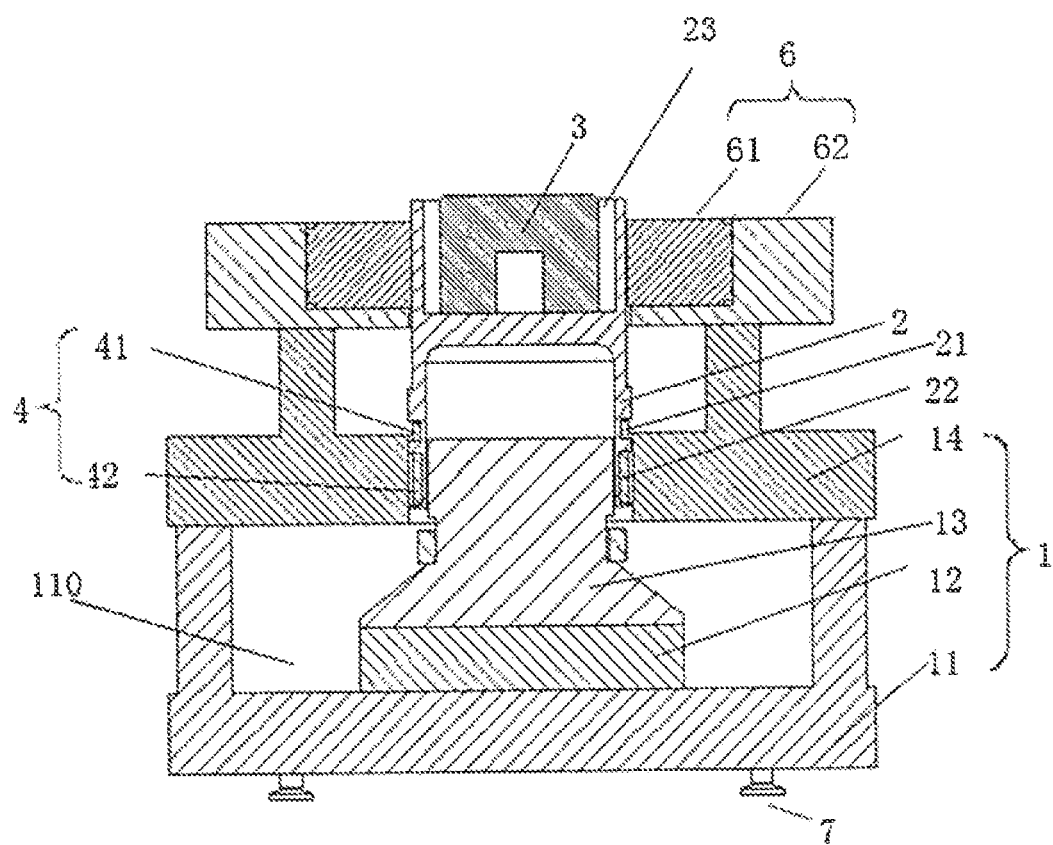
FIG. 1 is a schematic view showing a structure of a vibration table provided by an example of the present application.

In the drawings, the reference numerals are:
1—magnetic circuit device; 11—lower armature; 12—permanent magnet; 13—middle armature; 14—upper armature;
110—lower armature groove; 111—linear magnetic field region; 112—uniform magnetic field region;
2—moving coil skeleton; 21—first groove; 22—second groove; 23—placement groove;
3—adapter;
4—excitation coil; 41—DC excitation coil; 42—AC excitation coil; 5—cut-off groove;
6—lateral fixing device; 61—air bearing; 62—housing;
7—supporting member.

DETAILED DESCRIPTION

The technical solutions of the present application will be described clearly and completely with reference to the accompanying drawings. It is obvious that the described embodiments are only a part of the embodiments of the present application, and not all of the embodiments. All other embodiments obtained by those skilled in the art based on the embodiments of the present application without any creative efforts are within the scope of the present application.

Figure 2:
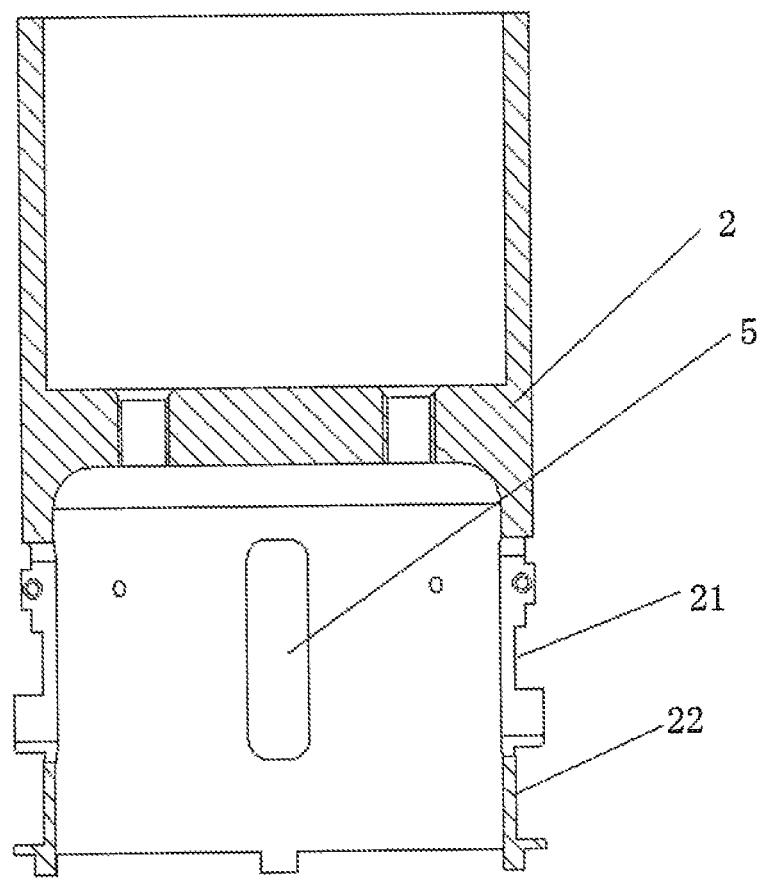
FIG. 2 is a schematic view showing a position where a cut-off groove provided by an example of the present application is formed.

An example of the present application provides a vibration table, as shown in FIG. 1, comprising; a magnetic circuit device 1 for generating a magnetic field; a moving coil skeleton 2, disposed in the magnetic circuit device 1, adapted for reciprocating in a magnetic field generated by the magnetic circuit device 1 along a direction of a central axis of the moving coil skeleton 2, and having a placement groove 23 with an upward opening; an adapter 3, disposed in the placement groove 23; an excitation coil 4, radially winding along an outer peripheral wall of the moving coil skeleton 2 and located in the magnetic field generated by the magnetic circuit device 1. As shown in FIG. 2, the moving coil skeleton 2 is provided with a cut-off groove 5 through the moving coil skeleton 2.

In the example of the present application, in order to reduce the influence of the vortex effect generated on the moving coil skeleton 2 on the high-frequency acceleration response of the vibration table, the moving coil skeleton 2 is provided with a cut-off groove 5, and its position and size ensure that the moving coil skeleton 2 is in a strong part of the magnetic field, so that the moving coil skeleton 2 does not form a closed loop, thereby greatly reducing the influence of the vortex effect, improving the high-frequency response characteristics of the vibration table, and extending the effective working frequency response range. A larger width of the cut-off groove 5 has a better effect of reducing the vortex effect. Preferably, in the present example, the cut-off groove 5 has the width ranging from 3 to 6 mm, but it is not limited thereto. In other examples, the size of the cut-off groove 5 may be determined according to the specific size of the moving coil skeleton 2.

Figure 3:
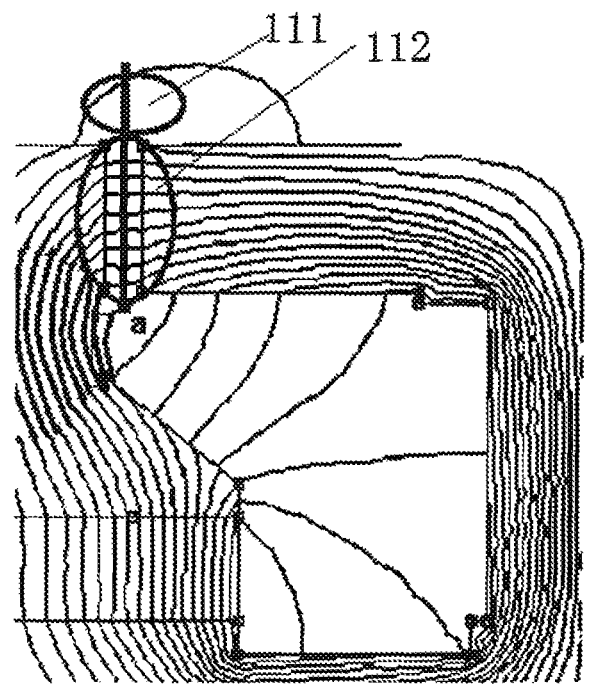
FIG. 3 is a schematic view showing a magnetic field distribution generated by a magnetic circuit device provided by an example of the present application.

In the example of the present application, as shown in FIG. 1, the magnetic circuit device 1 comprises a lower armature 11, provided with a lower armature groove 110; a permanent magnet 12, disposed in the lower armature groove 110; a middle armature 13, located above the permanent magnet 12; an upper armature 14, sleeved on the moving coil skeleton 2 to cover an opening of the lower armature groove 110. The middle armature 13 is partially sleeved by the moving coil skeleton 1. The magnetic fields generated by the lower armature 11, the permanent magnet 12, the middle armature 13 and the upper armature 14 form a closed loop as shown in FIG. 3. The magnetic field can be divided into a linear magnetic field area, a uniform magnetic field area, a non-linear magnetic field area, and a non-uniform magnetic field area, as shown in FIG. 3, circle 111 represents a linear magnetic field area, and circle 112 represents a uniform magnetic field area.

In the example of the present application, the excitation coil 4 comprises a DC excitation coil 41, radially winding along the outer peripheral wall of the moving coil skeleton 2 and located in a linear magnetic field generated by the magnetic circuit device 1; an AC excitation coil 42, radially winding along the outer peripheral wall of the moving coil skeleton 2 and located in a uniform magnetic field generated by the magnetic circuit device 1.

In the example of the present application, the moving coil skeleton 2 is further provided with a first groove 21, extending along a radial direction of the outer peripheral wall of the moving coil skeleton 2, with the DC excitation coil 41 located therein; a second groove 22, extending along a radial direction of the outer peripheral wall of the moving coil skeleton 2 and located below the first groove 21, with the AC excitation coil 42 located therein. The above arrangement makes the moving coil skeleton 2 in the excitation of the stable AC magnetic field within the entire effective working frequency range of the vibration table, thereby stabilizing the acceleration response of the moving coil skeleton 2 in the high-frequency vibration, and expanding the frequency response range of the vibration table. In this example, the walls of both the first groove 21 and the second groove 22 have a thickness of not less than 1 mm, but are not limited thereto. In other examples, the appropriate thickness may be determined according to the specific design size of the vibration table.

Figure 4:
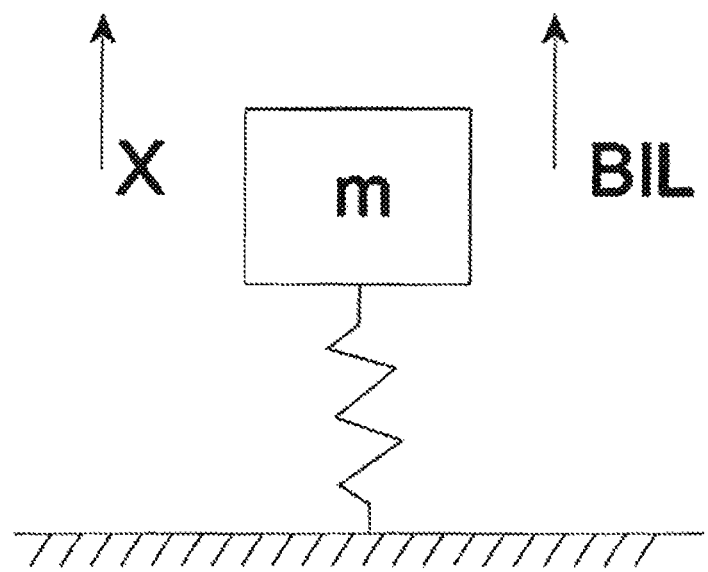
FIG. 4 is a simplified mechanical model of a moving coil skeleton vibration provided by an example of the present application.

In the example of the present application, the basic working mechanism of the vibration table is as follows: the DC excitation coil 41 is excited by the direct current in the linear magnetic field to generate an ampere force to counteract the combined gravity of the moving coil skeleton 2 and its load, and act as a buffer electromagnetic spring in the entire excitation system for buffering and storing energy. The AC excitation coil 42 is excited by the alternating current in the magnetic field to generate an axial ampere force to push the moving coil skeleton 2 to reciprocate up and down along the central axis, wherein the ampere force frequency is the same as the excitation current frequency. A simplified mechanical model of the moving coil skeleton 2 in vibration is shown in FIG. 4, wherein m is a total weight of the moving coil skeleton 2 and its load, BIL is the axial ampere force, and X is the acceleration of the moving coil skeleton 1.

In the example of the present application, the adapter 3 is an accelerometer adapter. The moving coil skeleton 2 drives the accelerometer connected to the adapter 3 under the action of the above magnetic field, and the accelerometer is calibrated by the comparison method. The moving coil skeleton 2 and adapter 3 are made of metal beryllium, which has an elastic modulus of 303 GPa, a density of 1840 kg/m³, a specific stiffness of 6.42 times that of aluminum and 6.53 times that of titanium. The specific stiffness is available from the following two formulas:

$$f_c = \frac{1}{2\pi}\sqrt{\frac{k}{m}},$$

$$C = \sqrt{\frac{E}{\rho}};$$

wherein, $f_C$ represents the natural frequency of the metal beryllium, the unit of which is hz; k represents the stiffness, the unit is N/m; C represents the specific stiffness, the unit is m/g; m represents the weight of the metal beryllium, the unit is kg; E represents the elastic modulus of the metal beryllium, the unit is pa; p represents the density of metal beryllium, the unit is kg/m³. The stiffness refers to the ability of a part to resist deformation, the size of which depends on the shape of the part and the elastic modulus of the material used. Greater elastic modulus of the material may cause stronger ability of the part to resist deformation and better stiffness. The relationship between stiffness and specific stiffness can be converted to the relationship between stiffness and elastic modulus. Since the metal beryllium has a high elastic modulus and a low density, it has a large specific stiffness, which is beneficial to increase the axial natural frequency of the moving coil skeleton 2 and improve the effective working frequency response range of the vibration table. The vibration table has an excitation frequency of up to 20 kHz during operation, and may simultaneously ensure to have a stable excitation acceleration value, i.e., good high-frequency characteristics.

In the example of the present application, the upper armature 14 is further provided with a hollow support pin; and the above vibration table further comprises a lateral fixing device 6, sleeved on the moving coil skeleton 2 and covering an opening of the support bin. The displacement of the moving coil skeleton 2 in the lateral direction can be suppressed by the lateral fixing device 6. As shown in FIG. 1, the lateral fixing device 6 may include an air bearing 61 and a housing 62, the air bearing 61 is fixed within the housing 62. The housing 62 is provided with a vent hole, through which gas passes through the housing 62 into the air bearing 61. In a specific example, a filtered high pressure gas may be filled into the air bearing 61 to make a high pressure air film formed between the moving coil skeleton 2 and the air bearing 61, so as to suppress the shift of the moving coil skeleton 2 in the lateral direction. However, it is not limited thereto, and in other examples, it may also be other means for suppressing lateral movement, such as elastic members.

In the example of the present application, the vibration table further comprises a supporting member 7, located below the lower armature 11, for supporting other structures of the above vibration table. In the present example, the supporting member 7 is a leveling screw, but is not limited thereto, and may be other supporting structures in other examples.

The vibration table provided in example of the present application uses a metal beryllium as a material for a moving coil skeleton and an accelerometer adapter. The large specific stiffness of the metal beryllium is used to increase the axial natural frequency of the moving coil skeleton, thereby increasing the effective working frequency range of the vibration table, i.e. improving its high-frequency performance. In order to solve the problems that during high-frequency vibration, the vortex loss generated by the moving coil skeleton under the excitation magnetic field affects the acceleration response of the moving coil skeleton, the vortex effect generated inside the moving coil skeleton is substantially reduced by providing a cut-off groove on the moving coil skeleton, making the acceleration response of the vibration table more stable, which reduces the difficulty of vibration control of the vibration table and improves its high-frequency performance, and increases the effective working frequency response range of the vibration table.

It is apparent that the above embodiments are merely examples for clarity of illustration, and are not intended to limit the embodiments. Other variations or modifications of the various forms may be made by those skilled in the art in view of the above description. There is no need and no way to present all of the embodiments. The obvious variations or modifications derived therefrom are still within the scope of protection created by the present application.

What is claimed is:
1. A vibration table, comprising:
a magnetic circuit device for generating a magnetic field;
a moving coil skeleton, disposed in the magnetic circuit device, adapted for reciprocating in a magnetic field generated by the magnetic circuit device along a direction of a central axis of the moving coil skeleton, and having a placement groove with an upward opening;
an adapter, disposed in the placement groove;
an excitation coil, radially winding along an outer peripheral wall of the moving coil skeleton and located in the magnetic field generated by the magnetic circuit device;
wherein, the moving coil skeleton is provided with a cut-off groove through the moving coil skeleton,
wherein, the magnetic circuit device comprises:
a lower armature, provided with a lower armature groove;
a permanent magnet, disposed in the lower armature groove;
a middle armature, located above the permanent magnet; and
an upper armature, sleeved on the moving coil skeleton to cover an opening of the lower armature groove.
2. The vibration table according to claim 1, wherein, the moving coil skeleton and the adapter are made of a metal beryllium.
3. The vibration table according to claim 1, wherein, the cut-off groove has a width ranging from 3 to 6 mm.
4. The vibration table according to claim 1, wherein, the magnetic fields generated by the lower armature, the permanent magnet, the middle armature, and the upper armature form a closed loop.
5. The vibration table according to claim 4, wherein, the middle armature is partially sleeved by the moving coil skeleton.
6. The vibration table according to claim 5, wherein, the excitation coil comprises:

a DC excitation coil, radially winding along the outer peripheral wall of the moving coil skeleton and located in a linear magnetic field generated by the magnetic circuit device;

an AC excitation coil, radially winding along the outer peripheral wall of the moving coil skeleton and located in a uniform magnetic field generated by the magnetic circuit device.

7. The vibration table according to claim 6, wherein, the moving coil skeleton is further provided with:

a first groove, extending along a radial direction of the outer peripheral wall of the moving coil skeleton, with the DC excitation coil located therein;

a second groove, extending along a radial direction of the outer peripheral wall of the moving coil skeleton and located below the first groove, with the AC excitation coil located therein.

8. The vibration table according to claim 4, wherein, the upper armature is further provided with a hollow support pin; and the vibration table further comprises a lateral fixing device, sleeved on the moving coil skeleton and covering an opening of the support bin.

9. The vibration table according to claim 4, further comprising:

a supporting member, located below the lower armature.

* * * * *